Patented Mar. 15, 1932

1,849,822

UNITED STATES PATENT OFFICE

ALBERT M. CLIFFORD, OF AKRON, OHIO, ASSIGNOR TO THE GOODYEAR TIRE & RUBBER COMPANY, OF AKRON, OHIO, A CORPORATION OF OHIO

ANTIOXIDANT OR AGE-RETARDER

No Drawing. Original application filed March 1, 1928, Serial No. 258,442. Divided and this application filed March 9, 1929. Serial No. 345,893.

My invention relates to methods of treating rubber and the product formed thereby and it has particular relation to a method of treatment whereby the durability of rubber may be greatly enhanced.

This application is a division of application Serial No. 258,442, filed March 1, 1928 which has resulted in Patent No. 1,763,579.

More specifically, the invention has for one of its objects the provision of a material which, when it is incorporated into rubber compounds, inhibits the absorption of oxygen and thus prevents premature loss of elasticity and tensile strength of the rubber.

Another object of the invention is to provide a non-odorous and non-poisonous antioxidant or age-retarder which may readily be incorporated into rubber.

Another object of the invention is to provide an anti-oxidant or age-retarder which is highly efficient in action and which is relatively inexpensive to manufacture.

One difficulty heretofore experienced with rubber compounds has been due to the absorption of oxygen which results in premature loss of elasticity and tensile strength of the compound. It has been proposed to overcome this difficulty by incorporating into the rubber prior to vulcanization a compound which inhibits the absorption of the oxygen. A relatively large number of compounds have been proposed for this purpose, but most of them are more or less unsatisfactory for various reasons. Some of them exist normally only in a liquid state, and for that reason can be incorporated into the rubber only with considerable difficulty. Some of these materials also possess strong and unpleasant odors which render the handling thereof an unpleasant task. Still others are more or less poisonous in their nature and their use in rubber compounds is likely to produce toxic effects upon the workmen employed in handling them.

This invention consists in the discovery that certain amino benzyl alcohols may be readily manufactured and incorporated into rubber compounds as antioxidants or age-retarders with highly gratifying results.

One material of this class is p-(alpha-naphthyl amido) benzyl alcohol which may be prepared by the following method.

Dissolve phenyl alpha-naphthylamine in alcohol in the proportions of 16 grams of the amine to 275 cc. of alcohol. Treat this solution with 8.8 grams of hydrochloric acid having a specific gravity of 1.17. The resulting solution should then be treated with 5.45 grams of a forty percent solution of formaldehyde. It may be necessary to warm this solution slightly before reaction takes place. The reaction results in a curdy precipitate which is allowed to stand until precipitation is complete. The precipitate should then be filtered, washed and suspended in alcohol. The alcoholic solution is next treated by making it alkaline with ammonium hydroxide. As a result of the latter treatment, a powder almost white in color and insoluble in alcohol is precipitated.

The same method may be employed in the manufacture of p-beta-naphthyl amido benzyl alcohol by substituting phenyl beta-naphthylamine for phenyl alpha-naphthylamine.

The invention is not limited to the naphthylamido benzyl alcohols as antioxidants but includes also the phenyl amido benzyl alcohols and other alcohols of the class having the formula

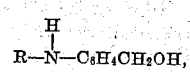

in which R represents a hydrocarbon group.

The substances just discussed may be employed in most of the standard rubber compounds with satisfactory results. The following is an example of a formula which insures a compound having excellent physical characteristics.

| | Parts |
|---|---|
| Acetone extracted rubber | 100 |
| Zinc oxide | 5 |
| Sulfur | 3 |
| Stearic acid | 1.5 |
| Hexamethylene tetramine | 1 |
| Antioxidant | 1 |

Samples of material prepared in accordance with the preceding formula in which the various materials disclosed were employed as antioxidants were subjected to vulcanization. Certain of the vulcanized samples were then subjected to physical tests in order to ascertain their elasticity and tensile strength prior to aging. Other samples of the same material were subjected to artificial aging for a period of six days in an oxygen bomb containing oxygen under a pressure of 150 pounds per square inch and at a temperature of 50° C. The results of these tests are indicated in the following tables:

P-(PHENYLAMIDO) BENZYL ALCOHOL

ORIGINAL

| Cure in mins. | Steam pressure | Stress in kgs./cm.$^2$ at— | | | % elong. at break | Per cent weight increase |
|---|---|---|---|---|---|---|
| | | 500 % elong. | 700 % elong. | Break | | |
| 30 | 40 | 15 | 44 | 105 | 865 | |
| 50 | 40 | 22 | 73 | 165 | 835 | |
| 70 | 40 | 29 | 106 | 170 | 780 | |

AGE TEST

| 30 | 40 | 22 | 70 | 105 | 775 | .05 |
| 50 | 40 | 29 | 100 | 130 | 750 | .35 |
| 70 | 40 | 38 | | 120 | 685 | .52 |

P-(ALPHA-NAPHTHYLAMIDO) BENZYL ALCOHOL

ORIGINAL

| 30 | 40 | 17 | 52 | 140 | 885 | |
| 50 | 40 | 22 | 80 | 165 | 830 | |
| 70 | 40 | 29 | 110 | 190 | 795 | |

AGE TEST

| 30 | 40 | 17 | 61 | 130 | 840 | .12 |
| 50 | 40 | 25 | 90 | 160 | 805 | .11 |
| 70 | 40 | 34 | 124 | 165 | 750 | .14 |

P-(BETA-NAPHTHYLAMIDO) BENZYL ALCOHOL

ORIGINAL

| 30 | 40 | 17 | 50 | 115 | 855 | |
| 50 | 40 | 23 | 83 | 160 | 815 | |
| 70 | 40 | 30 | 115 | 180 | 780 | |

AGE TEST

| 30 | 40 | 18 | 61 | 135 | 855 | .14 |
| 50 | 40 | 26 | 90 | 155 | 790 | .17 |
| 70 | 40 | 33 | 124 | 165 | 750 | .23 |

It will be evident from the preceding description that the invention constitutes a novel and highly satisfactory method for increasing the durability of rubber compounds. The method does not involve the employment of any poisonous or malodorous materials. The compounds employed are also powder-like substances which may be readily and uniformly dispersed throughout a rubber mass.

Although I have described in detail only the preferred forms which the invention may assume, it will be apparent to those skilled in the art that it is not so limited but that various minor modifications may be made therein without departing from the spirit of the invention or from the scope of the appended claims.

What I claim is:

1. A rubber product that has been vulcanized in the presence of a material having the formula

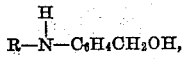

in which R is a benzene group, said group being composed solely of carbon and hydrogen and being directly attached to the nitrogen atom.

2. A rubber product that has been vulcanized in the presence of a reaction product of diphenylamine and formaldehyde.

3. A rubber product that has been vulcanized in the presence of the reaction product of a diaryl substituted amine and formaldehyde, said amine being composed solely of carbon, hydrogen and nitrogen and having its aryl groups directly attached to the nitrogen atom.

4. A method of preserving rubber which comprises incorporating therein phenyl amido benzyl alcohol.

5. An age resisting rubber compound to which has been added phenyl amido benzyl alcohol.

6. A method of preserving rubber which comprises incorporating therein a reaction product of molar proportions of formaldehyde and a secondary aryl amine, said amine containing two benzene groups directly attached to the amine group and consisting solely of carbon, hydrogen and nitrogen.

7. A rubber product that has been vulcanized in the presence of a reaction product of molar proportions of formaldehyde and a secondary amine containing two benzene groups directly attached to the nitrogen atom, such amine being composed solely of carbon, hydrogen and nitrogen.

In witness whereof, I have hereunto signed my name.

Signed at Akron, in the county of Summit and State of Ohio, U. S. A., this 8th day of March, 1929.

ALBERT M. CLIFFORD.